United States Patent [19]

Dolibois, deceased et al.

[11] 4,291,922

[45] Sep. 29, 1981

[54] ANTI-SKID MECHANISM FOR WHEELED VEHICLE

[75] Inventors: Ewald Dolibois, deceased, late of Farmington Hills, Mich.; Rose V. Dolibois, administratrix, 28369 Bay Tree Dr., Farmington Hills, Mich. 48018

[73] Assignee: Rose Dolibois, Farmington Hills, Mich.

[21] Appl. No.: 105,720

[22] Filed: Dec. 20, 1979

[51] Int. Cl.³ .............................................. B60B 15/00
[52] U.S. Cl. .................................... 301/46; 301/38 S
[58] Field of Search ................. 301/38 S, 39 R, 39 T, 301/40 R, 40 S, 41 R, 45, 46, 47

[56] References Cited

U.S. PATENT DOCUMENTS

| 1,247,281 | 11/1917 | Kempny | 301/46 |
| 2,007,853 | 7/1935 | Fuss | 301/46 |
| 2,454,407 | 11/1948 | Rosene | 301/47 |

FOREIGN PATENT DOCUMENTS

| 498623 | 1/1939 | United Kingdom. |
| 637493 | 5/1950 | United Kingdom | 301/47 |

Primary Examiner—David A. Simmons
Assistant Examiner—Thomas Bokan
Attorney, Agent, or Firm—Andrew E. Pierce

[57] ABSTRACT

There is disclosed an anti-skid mechanism for a wheeled vehicle suitable for attachment to the outer surface of at least two wheels of said vehicle. The mechanism includes a central flanged disk adapted to be mounted on the outer surface of the wheel, an annular plate slideably mounted on the flange of said disk, plurality of radially moveable arcuate ground-engageable shoes independently and slideably mounted between the planar surface of said disk and said plate, cam means on said plate operatively engageable with a centrally located cam follower on said shoes and abutment means for moving said plate toward said disk and for clamping said shoes therebetween.

6 Claims, 3 Drawing Figures

ANTI-SKID MECHANISM FOR WHEELED VEHICLE

BACKGROUND OF THE INVENTION

1. Field of the Invention

The invention relates to an anti-skid device for a wheeled vehicle.

2. Description of the Prior Art

It is known from British Pat. No. 498,623 that an anti-skid device can be adapted to be mounted on the outer surfaces of the wheel of a wheeled vehicle. In the mechanism disclosed, ground-engaging strakes are slideably mounted on a fixed disk which in turn is mounted upon the wheel of said vehicle. The strakes are slideably mounted in radial grooves of said disk. Co-acting with said disk, is a second disk in which spiral grooves are cut. Pins or pegs, etc. mounted on the axial parts of said strakes engage the spiral grooves so that extension or retraction of said strakes is accomplished by rotation of the adjustable disk.

It is also known from U.S. Pat. No. 2,454,407 that a non-skid mechanism can be adapted to be mounted on the inner surface of the wheel of a wheeled vehicle. In the mechanism disclosed, a plurality of ground-engageable arcuate shoes are slideably mounted both on a backing plate and at each end of said shoes where said shoes overlap. The mounting of each ground-engaging shoe in the central area of the shoe is accomplished by a plurality of grooves formed in the shoe to permit movement of the shoe in a direction parallel to a radius through the center portion of the shoe. The shoes can be moved so as to extend or retract them by clutch elements resiliently connected to each ground-engaging element. Coil springs secured to the ground-engaging element act to retract these ground-engaging elements when the clutch element is released.

The novel anti-skid device of the invention is an improved anti-ski mechanism with simple mounting means for preventing oscillation of the ground-engaging shoes when said shoes engage the ground surface and which provides an easily adjustable mechanism for extending or retracting said shoe.

SUMMARY OF THE INVENTION

There is disclosed an anti-skid device mechanism for a wheeled vehicle, particularly an automobile, or tractor, to provide traction when the vehicle is used under slippery conditions such as when the surface over which the vehicle passes is slippery as the result of snow or ice coating or in loosely compacted soil. The mechanism of the invention is adapted to be easily mounted upon at least two wheels of a wheeled vehicle, these two wheels being preferably the drive wheels of said vehicle.

The inventive mechanism comprises the combination of a flanged disk adapted to be mounted on the outer side of the wheel of a wheeled vehicle, an annular plate slideably mounted on the flange of said flanged disk, said plate being mounted for limited angular and limited axial movement relative to said disk, a plurality of radially moveable arcuate ground-engageable shoes independently and slideably mounted between the planar surfaces of said disk and said plate, cam means on said plate operatively engageable with a centrally located cam follower on said shoes for imparting radial movement to said shoes upon rotation of said plate relative to said disk, and abutment means for moving said plate toward said disk and for clamping said shoes therebetween so as to prevent rotational movement of said shoes relative to said disk and said plate.

DETAILED DESCRIPTION OF THE INVENTION

Figure 2:
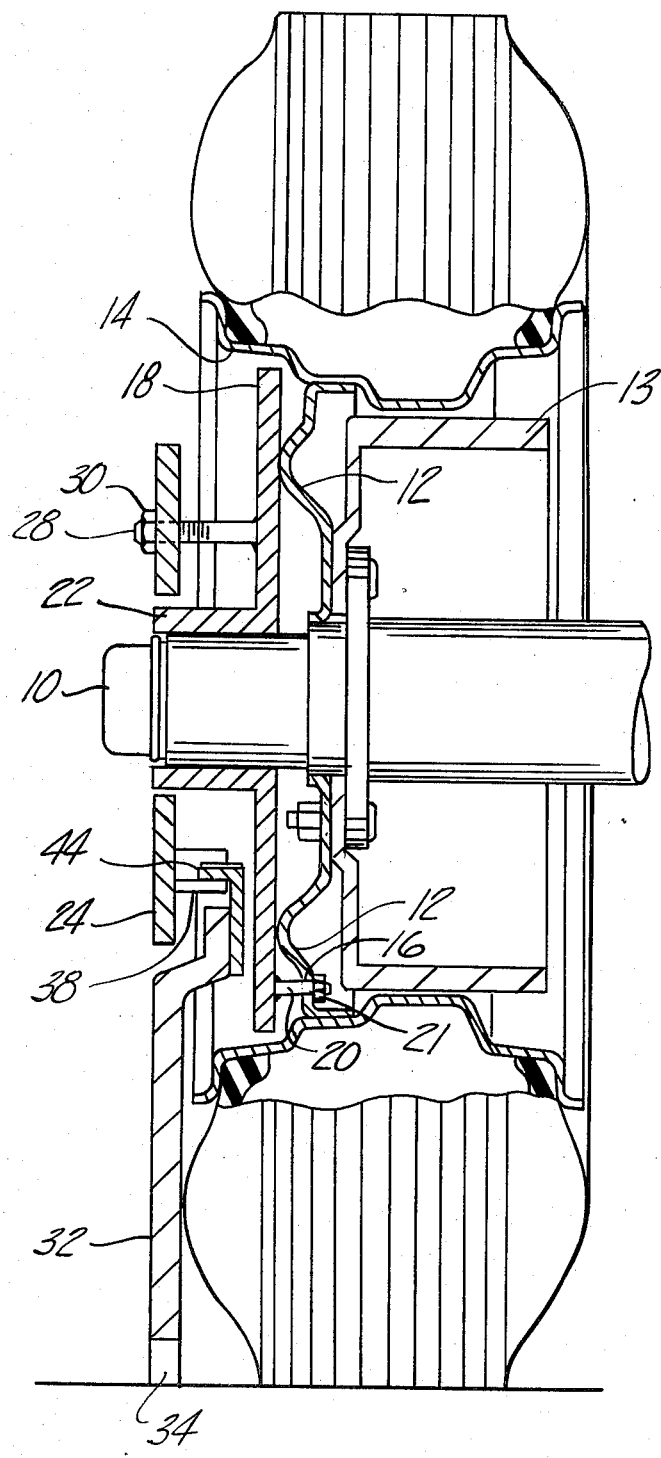
FIG. 2 is a sectional view taken on line II—II of FIG. 1.

Referring now to the drawing, in the embodiment of the invention shown, a vehicle wheel is shown as comprising a hub 10 and a brake drum 13 on which is mounted radially extending flanges 12 connected to rim 14. The flanges 12 are provided with a plurality of circumferentially-spaced holes 16 one of which is shown in FIG. 2, such holes being disposed immediately adjacent to the inner periphery of rim 14.

A flanged disk 18 is secured to the wheel by means of a plurality of studs 20. The studs 20 are secured to the disk 18 by welding or the like and are positioned to extend through the holes 16 formed in flanges 12. A nut 21 is threaded on each stud 20 and abuts one of the flanges 12 to hold the disk 18 securely against the wheel.

A radially extending flange 22 extends outwardly from the inner peripheral portion of the annular disk 18 and an annular plate 24 (shown in detail in FIG. 3) is slideably and rotatably mounted thereon. A plurality, preferably at least three arcuate slots 26 are formed in the annular plate 24 in circumferentially spaced relation each to the other and are adapted to receive respectively a plurality of axially extending studs 28 secured to the disk 18 by any suitable means such as by welding or the like. A nut 30 is threaded on one of the studs 28 and engages the plate 24 to move the same axially toward said disk 18 for a purpose which will more fully appear below.

Slideably mounted between the plates 24 and the disk 18 are a plurality of ground engageable shoes 32 which are here shown as being generally arcuate in form with the peripheral portion thereof cut away at 34 in any suitable manner to provide for increased traction and ventilation of the tire covered thereby. As the shoes 32 are identical, a description of one will serve to disclose the structure of all. The outer periphery of the shoe 32 may be provided with any suitable lugs or tread adapted to present a relatively unyielding surface to a supporting surface such as an icy road. The inner periphery of the shoe 32 is provided with a centrally disposed radial extension 36 which provides a cam follower disposed in abutting relation with an arcuate cam surface 38 defined by one side of one of a plurality of arcuate bosses 40 formed on the inner surface of the plate 24. The arcuate surface 42 defined by the side of each boss opposite the surface 38 is slideably engaged by one leg of an angle 44, the other leg of the angle 44 being secured to the shoe 32 by any suitable means such as welding or the like.

Figure 3:
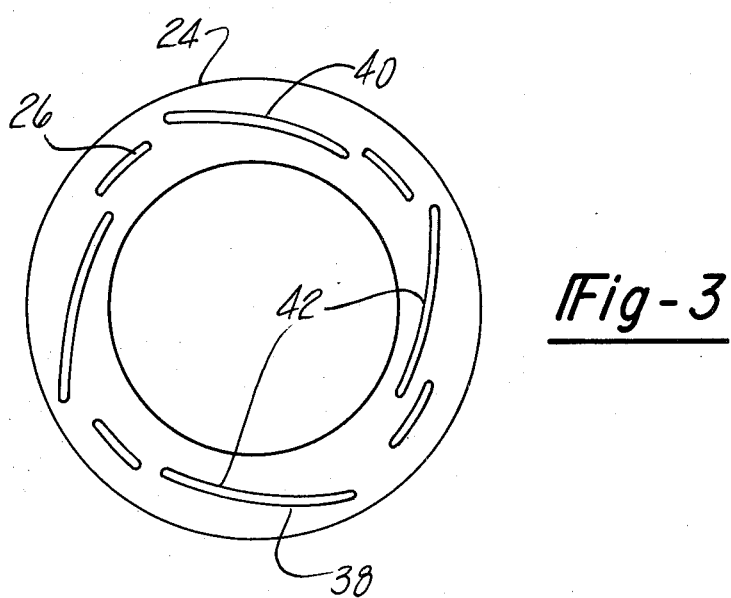
FIG. 3 is an elevation showing in detail the inner surface of the annular plate shown as part of the mechanism of FIG. 1.

As best shown in FIG. 3, one end of each boss 40 is spaced at a greater distance from the center of the plate 24 than is the other end thereof. Accordingly, rotational movement of the plate 24 relative to the disk 18 will cause the cam follower 36 to move along the boss 40 and radial movement will be imparted to the shoe 32 when rotational movement of the shoe 32 relative to the disk 18 is limited.

Means is provided for restraining rotational movement of the shoe 32 relative to the disk 18 and can take the form of a pair of parallel tracks, here shown as a pair of spaced parallel slots 46 formed in the shoe 32 and disposed on opposite sides of the cam follower 36. A suitable abutment or stop 48 extends into each slot 46 for slideable engagement with the edges thereof and is secured to the disk 18. This abutment means can be a stud secured to said disk by any suitable means such as welding or the like. The elongated slots 46 in each shoe 32 preferably extend parallel to a radius extending from the center of the plate 24 through the center of the cam follower 36. The function of this arrangement will be more clearly brought out in the following discussion of the operation of the device.

Figure 1:
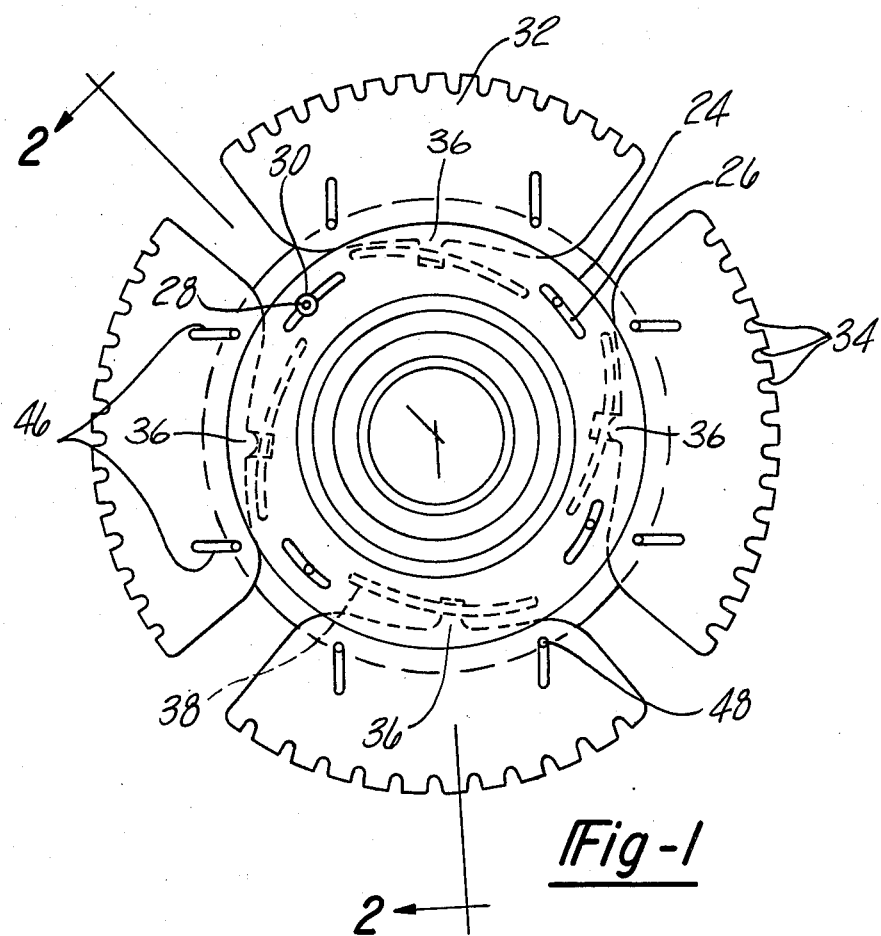
FIG. 1 is an elevation of a vehicle wheel having mounted thereon an embodiment of the anti-skid device of the invention.

Assume that the apparatus is in the condition shown in FIGS. 1 and 2 with the shoes 32 in radially extending ground-engaging position. As the wheel rotates, each portion of the periphery of the shoes 32 will sequentially engage the road surface and the force exerted by the road on the ground engaging shoe will pass through the point of contact and the center of the wheel. When this line of force acts along a radius extending through the cam follower 36, the shoe 32 is restrained from moving radially inward by engagement of the cam follower 36 with the cam surface 38. When this line of force is coincident with any other radius, it will urge the edges of the slots 46 against the abutments 48 and such engagement will be effective to prevent radially inward movement of the shoe 32. Thus, the abutments 48 and cam follower 36 provide a support for the shoe 32 which will maintain the same in radially extended position and which will resist any force which tends to rock the shoe or move the same radially inward. To insure retention of the various parts in their relative positions as shown in the drawings, the nut 30 is drawn up against the plate 24 to move the same toward the disk 18 thereby clamping the shoes 32 firmly therebetween and providing a positive locking arrangement.

When it is desired to position the shoes 32 in a non-operative position, the nut 30 is loosened and the plate 24 is rotated in a counterclockwise direction as shown in the drawings. The angle 44 will ride up the cam surface 42 thereby moving the shoes 32 radially inward and out of ground-engaging position. The nut 30 may then be retightened to move the plate 24 toward the disk 18 and clamp the shoes 32 therebetween. It is to be noted that although the coaction of the abutments 48 and edges of the slots 46 restrain radial movement of the shoes 32 under the notion of external forces, these elements exert no restraining forces on the shoes 32 when the same are moved by the cam device since the force exerted by the cam acts on a line which is parallel to the axes of the notches 46.

When it is desired to return the shoes 32 to their radially extended ground engaging positions, the nut 30 is loosened and the plate 24 is rotated in a clockwise direction as shown in the drawings. The cam follower 36 will ride down the cam surface 38 to slide the shoes 32 radially outward until the abutments 48 engage the ends of the notches 46. The nut 30 may then be retightened to once more clamp the shoes 32 between the plate 24 and the disk 18 and retain the various parts in position for steady state operation.

It will be apparent from the foregoing that the embodiment of the invention here shown and described provides a new and improved anti-skid device for vehicles and accordingly accomplishes the objects of the invention. On the other hand, it will be obvious to those skilled in the art that the illustrated embodiment may be variously changed and modified or features thereof, singly or collectively embodied in other combinations than that illustrated without departing from the spirit of the invention or sacrificing all the advantages thereof, and that accordingly the disclosures herein are illustrative only and the invention is not limited thereto.

What is claimed is:

1. An anti-skid device for a wheeled vehicle comprising the combination of:
   A. a flanged disk adapted to be mounted on the outer side of the wheel of at least two wheels of said vehicle;
   B. an annular plate slideably mounted on the flange of said flanged disk, said plate being mounted for limited angular and limited axial movement relative to said flanged disk;
   C. a plurality of radially moveable arcuate ground-engageable shoes independently and slideably mounted between the planar surfaces of said flanged disk and said plate and wherein said shoes have at least two spaced parallel tracks formed thereon, said tracks being parallel to a radius extending through a centrally located cam follower on said shoes and said flanged disk has abutment means arranged for engagement with said tracks;
   D. cam means on said plate operatively engageable with said centrally located cam follower on said shoes for imparting radial movement to said shoes upon rotation of said plate relative to said flanged disk; and
   E. abutment means for moving said plate towards said flanged disk and for clamping said shoes therebetween thereby preventing rotational movement of said shoes relative to said flanged disk and said plate.

2. The device of claim 1 wherein said annular plate has at least three spaced arcuate slots formed in said plate adapted for engagement with said means for angularly moving said plate and for clamping said shoes between said plate and said flanged disk.

3. The device of claim 2 wherein said plate has four arcuate slots formed in said plate and said device has four of said ground engageable shoes.

4. The device of claim 3 wherein said plate has four cam elements located on the inner surface of said plate between said plate and said flanged disk and said shoes each have a cam follower located between said plate and said flanged disk.

5. The device of claim 4 wherein each of said cam elements on said plate engages at said cam follower a single ground-engaging shoe, said cam element being engageable with said cam follower of said shoe so that radial movement either away from or toward the axis of said wheel can be imparted upon rotation of said plate relative to said flanged disk.

6. The device of claim 5 wherein said tracks of said shoes are slots, said abutment means on said flanged disk for moving said plate toward said disk and studs, said plate has arcuate slots formed in said plate which engage with said studs and said cam elements on said plate are each arcuate bosses wherein the arcuate surface defined by the inner side of each boss is slideably engaged by one leg of an angle cam follower secured to said shoe by any suitable means and said vehicle is an automobile or tractor.

* * * * *